(12) United States Patent
Larson

(10) Patent No.: US 10,503,277 B1
(45) Date of Patent: *Dec. 10, 2019

(54) ACCELEROMETER-BASED CONTENT DISPLAY ADJUSTMENT

(71) Applicant: Amazon Technologies, Inc., Seattle, WA (US)

(72) Inventor: Christopher Thomas Larson, Rancho Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,646

(22) Filed: Dec. 12, 2016

Related U.S. Application Data

(63) Continuation of application No. 13/932,869, filed on Jul. 1, 2013, now Pat. No. 9,545,564.

(51) Int. Cl.
*G06F 3/0346* (2013.01)
*G09G 5/38* (2006.01)
*A63F 13/525* (2014.01)

(52) U.S. Cl.
CPC .......... *G06F 3/0346* (2013.01); *A63F 13/525* (2014.09); *G09G 5/38* (2013.01)

(58) Field of Classification Search
CPC ...... A61B 5/0031; A63F 13/12; A63F 13/525; G06F 3/0346; G09G 5/38
See application file for complete search history.

(56) References Cited

U.S. PATENT DOCUMENTS

| | | | |
|---|---|---|---|
| 2006/0189386 A1* | 8/2006 | Rosenberg | A63F 13/12 463/37 |
| 2006/0223635 A1* | 10/2006 | Rosenberg | A63F 13/10 463/37 |
| 2008/0070684 A1 | 3/2008 | Haigh-Hutchinson | |
| 2008/0146336 A1* | 6/2008 | Feldman | A63F 13/02 463/37 |
| 2010/0062833 A1 | 3/2010 | Mattice et al. | |
| 2014/0362117 A1 | 12/2014 | Paulson | |

OTHER PUBLICATIONS

Office action for U.S. Appl. No. 13/932,869, dated Nov. 30, 2015, Larson, "Accelerometer-Based Content Display Adjustment", 8 pages.
Office Action for U.S. Appl. No. 13/932,869, dated Mar. 17, 2015, Christopher Thomas Larson, "Accelerometer-Based Content Display Adjustment", 8 pages.
Office action for U.S. Appl. No. 13/932,869, dated Apr. 13, 2016, Larson, "Accelerometer-Based Content Display Adjustment", 11 pages.

\* cited by examiner

*Primary Examiner* — David Duffy
*Assistant Examiner* — Ankit B Doshi
(74) *Attorney, Agent, or Firm* — Lee & Hayes, P.C.

(57) ABSTRACT

Some electronic devices may not include hardware such as a gyroscope that is capable of providing precise orientation information. In some implementations, accelerometer data may be used to determine a content display adjustment (e.g., an adjustment to a first person perspective view in a game scene) by sampling accelerometer data over multiple time periods. For example, accelerometer data may be used to determine short term and longer term accelerometer sample values. The content display adjustment may be determined based at least in part on the accelerometer sample values and information associated with the content display adjustment may be communicated to a display.

20 Claims, 5 Drawing Sheets

US 10,503,277 B1

ACCELEROMETER-BASED CONTENT DISPLAY ADJUSTMENT

CROSS-REFERENCE TO RELATED APPLICATION

This application is a continuation of U.S. patent application Ser. No. 13/932,869, filed Jul. 1, 2013, titled "ACCELEROMETER-BASED CONTENT DISPLAY ADJUSTMENT", now U.S. Pat. No. 9,545,564, the entire disclosure and contents of which are hereby incorporated by reference herein.

BACKGROUND

Some electronic devices may include hardware such as a gyroscope that may be able to provide absolute orientation information. For such devices, a change in device orientation may be determined based on a change in absolute orientation values measured by the gyroscope. However, some electronic devices may include limited hardware that may not be capable of providing such precise information. For example, some devices may include an accelerometer that may be able to detect device movement but may not be able to provide absolute orientation information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes, in part, techniques and arrangements for controlling a user interface (e.g., a first person perspective view, referred to herein as an "in-game camera") in a three-dimensional game scene based on accelerometer data. In some implementations, an electronic device may include an accelerometer but may be free from a gyroscope. In some examples, the techniques described herein may utilize data captured by the accelerometer to adjust displayed content. For example, the techniques described herein may adjust a view to allow a user to "look around" the game scene as a visual aid to add depth. Some implementations may include one or more "smoothing" approaches to be applied to the accelerometer data, including sampling relatively short-term and relatively long-term accelerometer data to smoothly change the orientation of the in-game camera to avoid updates that may be disturbing to a user or otherwise adversely affect game play.

Example Frameworks

Figure 1:
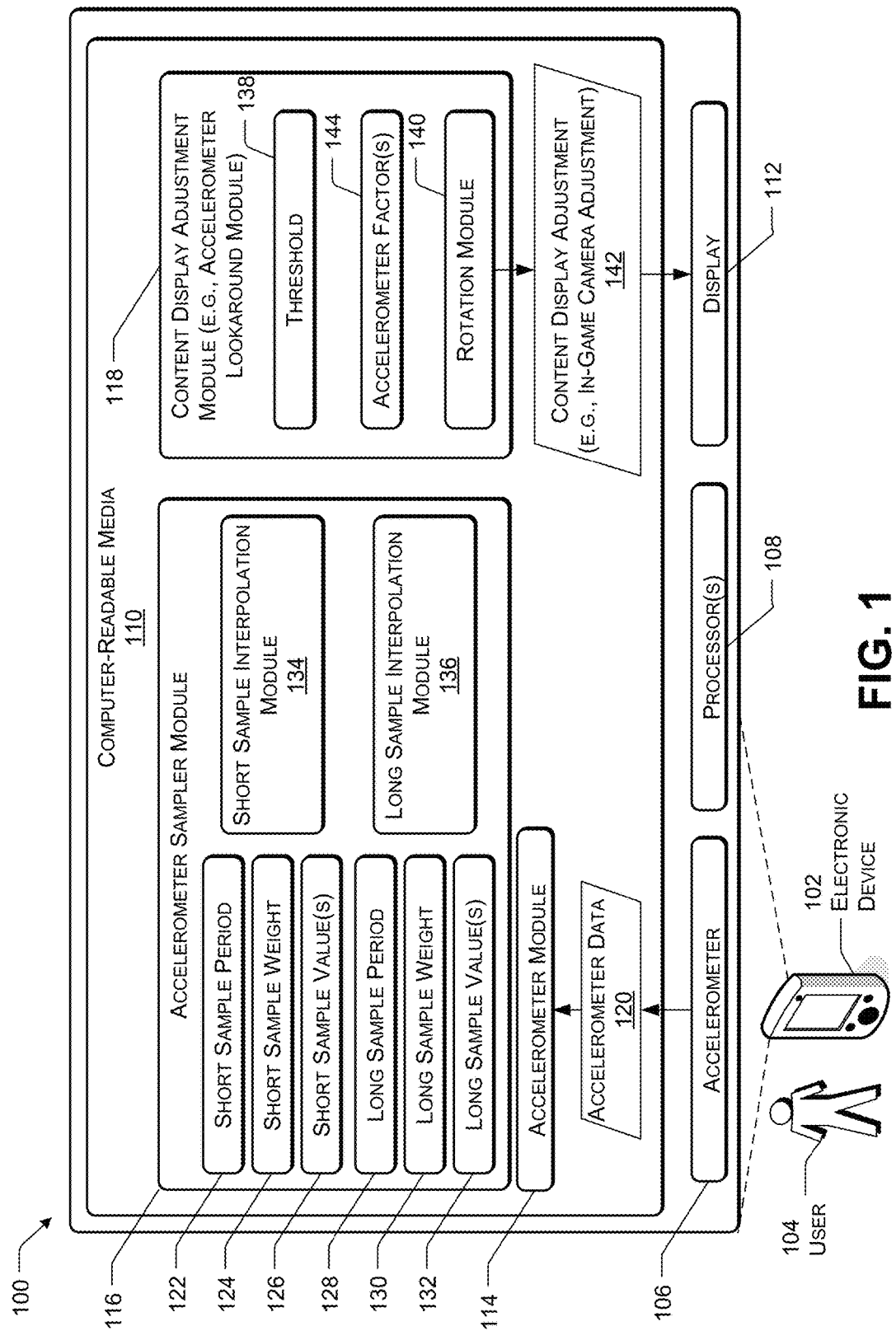
FIG. 1 illustrates an example framework for updating information displayed on an electronic device according to some implementations.

FIG. 1 illustrates an example framework 100 for updating information displayed on an electronic device 102 of a user 104 according to some implementations. In FIG. 1, the user 104 may be playing a game (e.g., a first-person shooter game) that includes an "in-game camera" that may provide first-person perspective views into an associated game scene. In some implementations, the electronic device 102 may not include a gyroscope or other device that is capable of determining an absolute orientation of the electronic device 102. Thus, FIG. 1 illustrates that, in response to the user 104 rotating or otherwise re-orienting the electronic device 102, a perspective view (e.g., an "in-game camera") may be adjusted based at least in part on accelerometer data without the absolute device orientation information provided by a gyroscope.

The electronic device 102 may be implemented as any of a number of electronic devices, such as a smart phone, an eBook reader, a media player, a tablet computing device, a portable gaming device, a portable digital assistant, a laptop or netbook computer, and so forth. Furthermore, the electronic device 102 may not necessarily be a mobile or portable device, and thus, in some implementations may include a display of a desktop or other computing device, a gaming system, a television, other home electronics devices, and so forth.

In the example illustrated in FIG. 1, the electronic device 102 includes an accelerometer 106, one or more processors 108, one or more computer-readable media 110, and a display 112. The computer-readable media 110 may include at least an accelerometer module 114, an accelerometer sampler module 116, and a content display adjustment module 118. In some implementations, the content display adjustment module 118 may include an accelerometer lookaround module.

The accelerometer module 114 may be configured to poll or otherwise receive accelerometer data 120 from the accelerometer 106. In some examples, the accelerometer data 120 may include three values of force relative to gravity (e.g., "g" forces) along three axes (e.g., an x-axis, a y-axis, and a z-axis). To illustrate, the accelerometer data 120 may include x, y, z values associated with an amount of force relative to gravity along an x-axis of the electronic device 102, a y-axis of the electronic device 102, and a z-axis of the electronic device 102, respectively. In some implementations, the accelerometer data 120 may be device-specific accelerometer data that may be determined based on the particular electronic device, accelerometer, or a combination thereof.

The accelerometer 106 may be configured to determine changes in force relative to gravity along the x, y, and z axes at a particular frequency. For example, in some cases, the accelerometer 106 may update x, y, z values every 60th or 100th of a second. As such, in these examples, the accelerometer 106 may generate 60 to 100 updated x, y, z values per second. In some cases, such data may be erratic ("jerky") at least in part due to the high data update frequency. As such, the accelerometer sampler module 116 may include one or more functions or modules that may be used to "smooth out" such data to avoid content display adjustments (e.g., updates to the in-game camera) that may be disturbing to the user 104 or otherwise adversely affect game play. It will be appreciated that content display adjustments may not be limited to in-game camera adjustments. For example, alternative content display adjustments may include user interface orientation adjustments, scene adjustments, or displayed object adjustments. As an illustrative, non-limiting example, a particular user interface element displayed in a game scene may be re-oriented while the remaining portion of the game scene maintains the same orientation.

The accelerometer sampler module 116 may include or otherwise have access to a short sample period 122, a short sample weight 124 and one or more short sample values 126. Further, the accelerometer sampler module 116 may include or otherwise have access to a long sample period 128, a long sample weight 130 and one or more long sample values 132. In some cases, the short sample value 126 may represent data sampled over a shorter period of time than the long sample value 132 and thus may include more erratic data associated with short-term variations in the accelerometer data 120. The long sample value 132 may represent data sampled over a longer period of time and may be used to "smooth out" the possibly erratic accelerometer data 120 measured by the accelerometer 106 over short-term periods of time.

To illustrate, a game that includes an in-game camera (e.g., a first person perspective view) may operate at 30 frames per second, and the accelerometer module 114 may sample every frame. Thus, in this case, the accelerometer data 120 may represent 30 x, y, z values every second. As illustrative, non-limiting examples, the short sample period 122 may be about 0.1 seconds, corresponding to about 3 frames of x, y, z accelerometer data. In this case, the short sample value 126 may represent an average of the 3 frames of x, y, z accelerometer data obtained over the short sample period 122. The long sample period 128 may be about 2 seconds, corresponding to about 60 frames of x, y, z accelerometer data. In this case, the long sample value 132 may represent an average of the 60 frames of x, y, z accelerometer data obtained over the long sample period 128. As the short sample period 122 includes fewer frames of data, the data obtained over the short sample period 122 may be more erratic ("less smooth") than the data obtained over the long sample period 128.

In some implementations, one or more interpolation modules (e.g., linear interpolation functions) may provide an in-game camera experience with transitions that may not appear to the user 104 to be jittery or unnaturally slow. That is, using long-term accelerometer data may reduce the possibly jittery nature of short-term accelerometer data, while using short-term accelerometer data may reduce the possibility of an in-game camera adjustment that may appear unnaturally slow to the user 104. The interpolation modules may include functions that utilize at least one or more sample values, current accelerometer data, and one or more sample weights. The interpolation modules may determine a long sample value and a short sample value and may provide the values to the content display adjustment module 118 in order to adjust the in-game camera.

In the example of FIG. 1, the accelerometer sampler module 116 includes a short sample interpolation module 134 and a long sample interpolation module 136. The short sample interpolation module 134 may update the short sample value 126 based on a most recent short sample value, the current accelerometer data 120 and the short sample weight 124. Similarly, the long sample interpolation module 136 may update the long sample value 132 based on a most recent long sample value, the current accelerometer data 120 and the long sample weight 130.

The short sample weight 124 may represent an amount of time since the last frame was sampled divided by the short sample period 122. The long sample weight 130 may represent the amount of time since the last frame was sampled divided by the long sample period 128. To illustrate, in the case of a game operating at 30 frames per second, the amount of time between frame samples may correspond to $\frac{1}{30}$th of a second.

The short sample interpolation module 134 may provide the updated short sample value 126 to the accelerometer lookaround module 118, and the long sample interpolation module 136 may provide the updated long sample value 132 to the content display adjustment module 118. In some cases, the content display adjustment module 118 may calculate a new rotation for the in-game camera relative to a resting rotation based at least in part on a difference between the updated short sample value 126 and the updated long sample value 132. In some implementations, the long sample value may represent a stable state, and when the difference between a short sample value and a long sample value meets or exceeds a threshold 138, a rotation module 140 may determine that the display 112 should perform a content display adjustment 142 (e.g., an in-game camera adjustment 142). Accordingly, the content display adjustment module 118 may communicate information associated with the in-game camera adjustment 142 to the display 112. In some implementations, the content display adjustment module 118 may include one or more accelerometer factors 144 to determine the in-game camera adjustment 142. In some case, the in-game camera adjustment 142 may represent a rotation of the in-game camera based on sample value differences along each axis relative to a current orientation of the in-game camera.

In some implementations, the computer-readable media 110 may also include or otherwise have access to a function that may return a desired camera forward direction. The function may return a constant direction or a variable direction. The computer-readable media 110 may also include or otherwise have access to a function that may return a desired camera up direction at any time. The function may return a constant direction or a variable direction. In some implementations, the in-game camera orientation may return to the desired camera forward direction and the desired camera up direction when the difference between the long sample value 132 and the short sample value 126 indicates that the orientation of the electronic device 102 has stabilized.

As illustrative, non-limiting examples, the threshold 138 may be set low (e.g., 0.01), while the one or more accelerometer factors 144 may include a first adjustment factor (e.g., 0.25) to adjust x-axis accelerometer data, a second adjustment factor (e.g., 0.15) to adjust y-axis accelerometer data, and a third adjustment factor (e.g., 0.0). For each frame, a normalization function may be used to calculate each item with unit vectors, and a camera rotation function may calculate a resting camera position by determining a forward direction and an up direction. If the magnitude of the change in accelerometer data does not meet or exceed the threshold 138, there may be no rotation of the in-game camera.

When the magnitude of the change in accelerometer data meets or exceeds the threshold 138, a function may perform a scalar product of the difference between the short and long sample values with the accelerometer factors 144 to approximate an angular change when moving the electronic device

102. Another function may move the target forward direction in a new direction based on a combination of an output of a forward function and the output of an accelerometer change function. The rotation module 140 may calculate the in-game camera adjustment 142 from the original target forward direction to the new resultant direction based on a combination of an output of the target forward function and the new direction function.

Thus, FIG. 1 illustrates an example framework 100 for providing an in-game camera experience with transitions that may not appear to the user 104 to be jittery or unnaturally slow.

Figure 2:
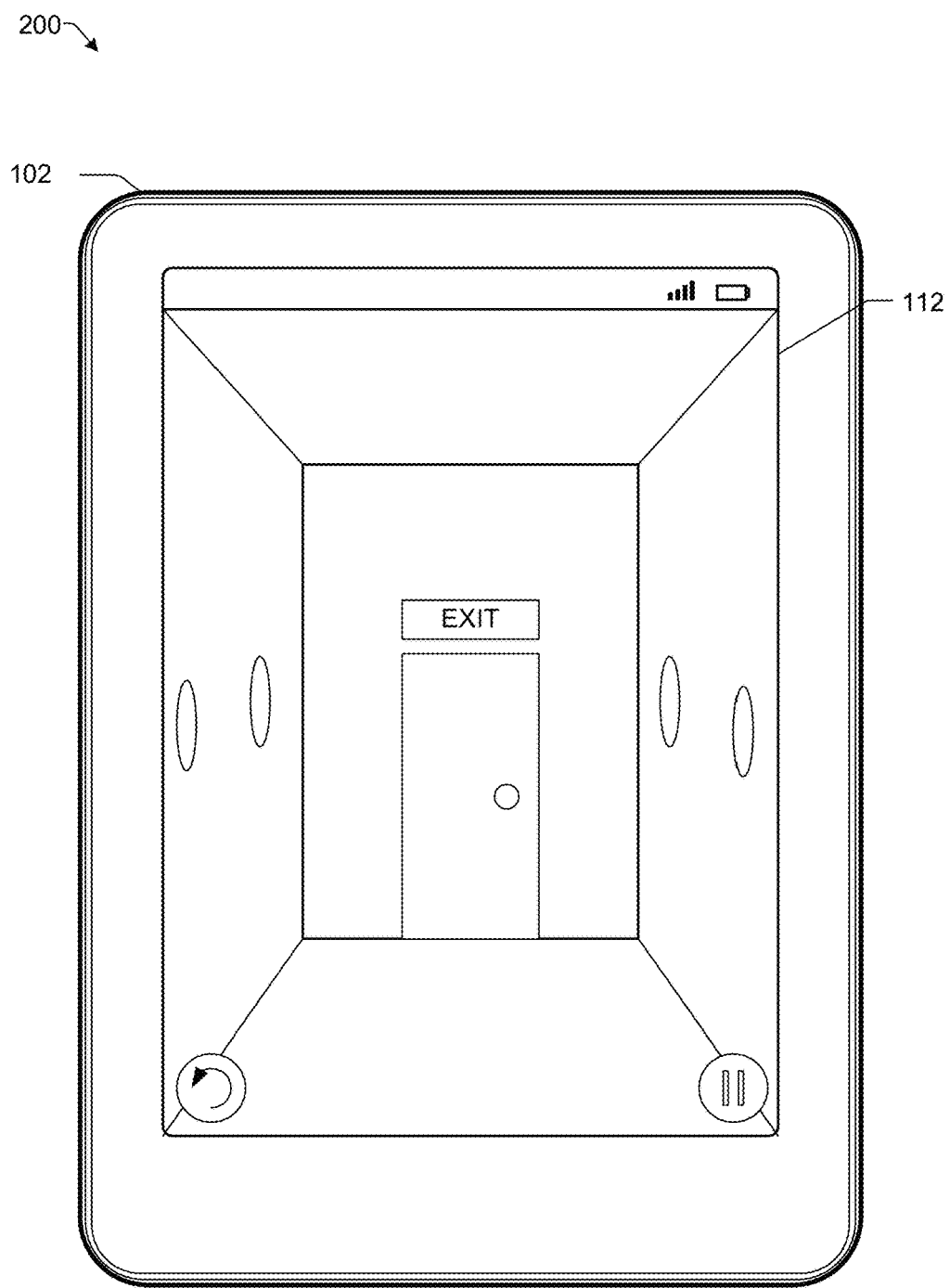
FIG. 2 illustrates an example of a user interface displayed on an electronic device while the device runs a gaming application. In this example, the device may include an accelerometer but may not include a gyroscope.

FIG. 2 illustrates an example user interface 200 displayed on the display 112 prior to rotation of the electronic device 102 by the user 104 according to some implementations. That is, the user interface 200 of FIG. 2 represents an output of an in-game camera prior to the in-game camera adjustment 142 provided to the display 112.

In some implementations, the user 104 may rotate the electronic device 102 in a particular direction along one or more of an x-axis, a y-axis, or a z-axis of the electronic device 102. As described above with respect to FIG. 1, the electronic device 102 may identify this rotation based on the accelerometer data 120 received from the accelerometer 106.

Figure 3:
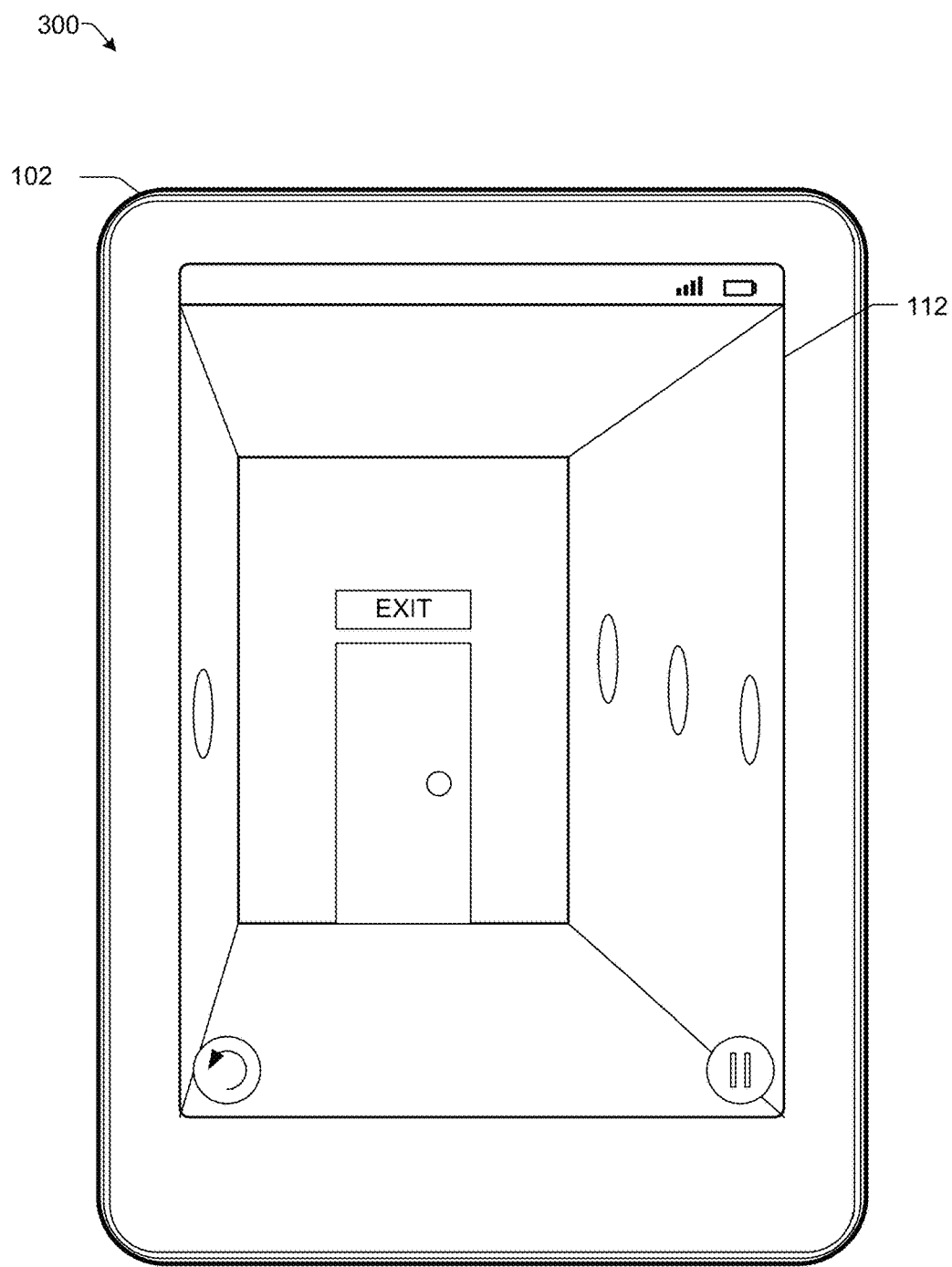
FIG. 3 illustrates an example of a user interface displayed on the electronic device of FIG. 2 after a user has moved the device. In this example, the accelerometer may provide an indication that the device has moved and, in response, the gaming application may modify the user interface based on this indication.

FIG. 3 illustrates an example user interface 300 displayed on the display 112 after rotation of the electronic device 102 by the user 104 according to some implementations. That is, the user interface 300 of FIG. 3 represents an output of an in-game camera after the in-game camera adjustment 142 has been provided to the display 112. At least a portion of game scene information visible on the display 112 prior to the in-game camera adjustment may be removed. Further, additional game scene information not visible on the display 112 prior to the in-game camera adjustment may be displayed.

As an illustrative example, the user 104 may rotate the electronic device 102 such that the left side of the electronic device 102 moves forward with respect to an xy plane (e.g., away from the user 104), while the right side of the electronic device 102 moves backward with respect to the xy plane (e.g., toward the user 104). This may indicate a desire by the user 104 to pan the in-game camera to "lookaround" the game scene as though the user 104 were moving a camera to the right substantially within the xy plane. It will be appreciated that the terms "left" and "right" are for illustrative purposes with reference to particular example illustrated in FIG. 3.

To illustrate, in FIG. 2, the game scene includes the user 104 directly facing an exit door, with two windows along a left wall and two windows along a right wall. The user 104 may desire to adjust the game scene such that the user 104 is no longer directly facing the exit door, but rather is virtually turning her head toward the right wall. As described above, the user 104 may indicate this desire to move the in-game camera in this direction by moving the left side of the electronic device 102 forward with respect to the xy plane (e.g., away from the user 104).

FIG. 3 illustrates that, in response to the user 104 moving the electronic device 102, the user interface 300 now illustrates the game scene such that the user 104 is no longer directly facing the exit door but rather has panned to the right. As illustrated in FIG. 3, the exit door has shifted to the left on the display 112, the left wall includes one window instead of two windows as in FIG. 2, and the right wall includes three windows instead of two windows as in FIG. 2.

While FIGS. 2 and 3 illustrate an illustrative example of the user 104 rotating the left side of the electronic device 102 forward with respect to the xy plane (e.g., away from the user 104), it will be appreciated that alternative orientation changes are possible. For example, the user 104 may rotate the right side of the electronic device 102 forward with respect to the xy plane (e.g., away from the user 104), resulting in the in-game camera panning to the left. As another example, the user 104 may rotate a top side of the electronic device 102 forward or backward with respect to the xy plane, resulting in the in-game camera panning down or up, respectively.

Alternatively, the user 104 may re-orient the electronic device 102 along multiple axes at the same time. That is, the re-orientation of the electronic device 102 may not be limited to rotation about a single axis but rather may represent a re-orientation of the electronic device 102 in multiple directions. In this case, the in-game camera may pan left, right, up, down, or some combination thereof.

Example Electronic Device

Figure 4:
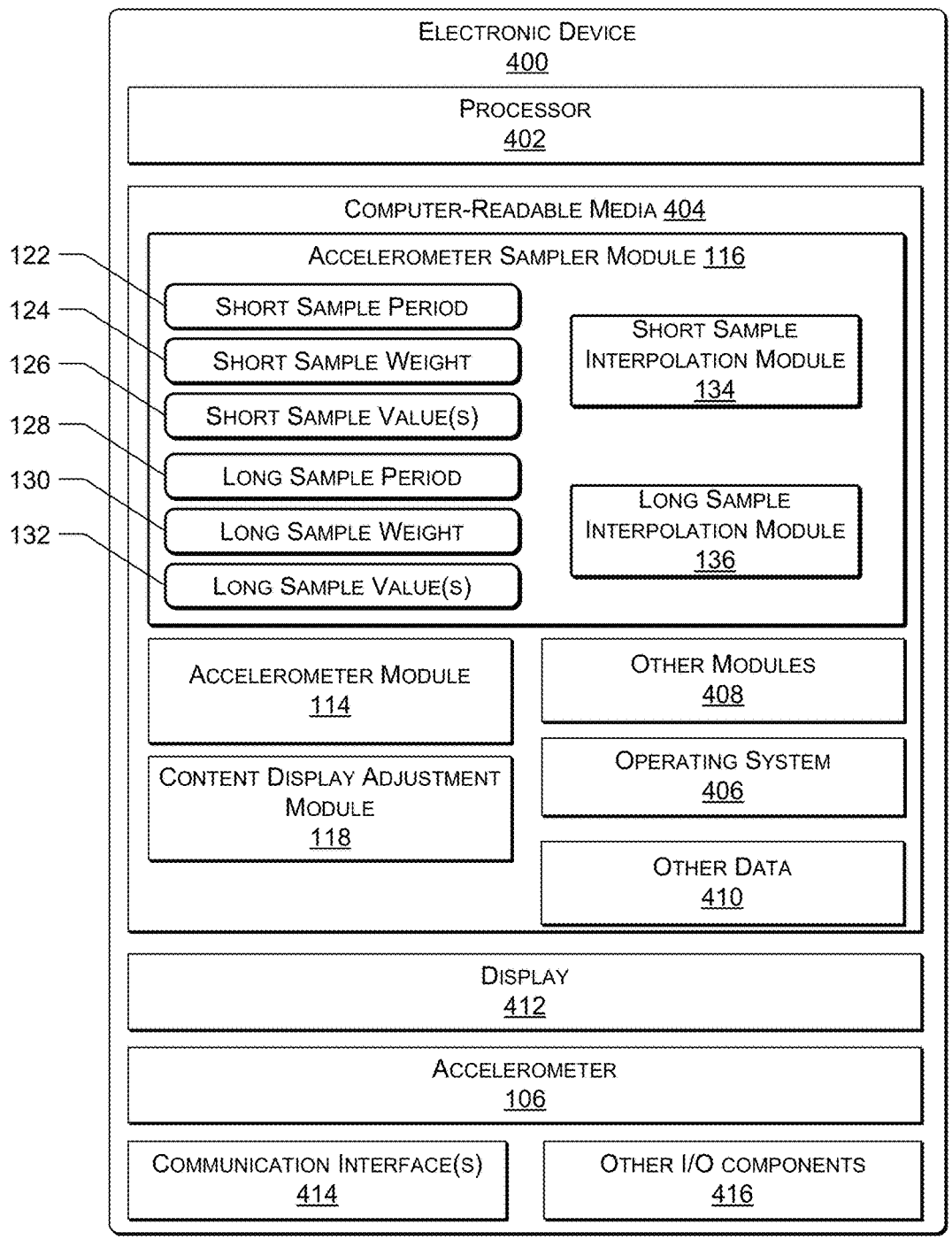
FIG. 4 illustrates select components of an example electronic device configured to display user interfaces and modify displayed content based on information provided by an accelerometer or other device component that is capable of providing indications of device movement.

FIG. 4 illustrates select example components of an electronic device 400 (e.g., the electronic device 102 of FIG. 1) that may be used to implement the functionality described above according to some implementations. In a very basic configuration, the electronic device 400 includes, or accesses, components such as at least one processor 402 and a computer-readable media 404. Each processor 402 may itself comprise one or more processors or cores. The processor(s) 402 can be configured to fetch and execute computer-readable instructions stored in the computer-readable media 404 or other computer-readable media.

Depending on the configuration of the electronic device 400, the computer-readable media 404 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 402 directly or through another computing device. Accordingly, the computer-readable media 404 may be computer-readable media able to maintain instructions, modules or components executable by the processor 402.

The computer-readable media 404 may be used to store any number of functional components that are executable by the processor 402. In some implementations, these functional components comprise instructions or programs that are executable by the processor 402 and that, when executed, implement operational logic for performing the actions attributed above to the electronic device 400. Functional components of the electronic device 400 stored in the computer-readable media 404 may include the accelerometer module 114, the accelerometer sampler module 116, and the content display adjustment module 118 (e.g., an accelerometer lookaround module), as described above, which may be executed on the processor 402. Additional functional components associated with the accelerometer sampler module 116 stored in the computer-readable media 404 may include the short sample interpolation module 134 and the long sample interpolation module 136. Other functional components may include an operating system 406 for controlling and managing various functions of the electronic device 400. Depending on the type of the electronic device 400, the computer-readable media 404 may also optionally include other functional components, such as other modules 408, which may include applications, programs, drivers and so forth.

The computer-readable media 404 may also store data, data structures, and the like that are used by the functional components. For example, data stored by the computer-readable media 404 may include the short sample period 122, the short sample weight 124, the one or more short sample values 126, the long sample period 128, the long sample weight 130, and the one or more long sample values 132. The electronic device 400 may also include other data 410, which may include, for example, data used by the operating system 406 and the other modules 408. Further, the electronic device 400 may include many other logical, programmatic and physical components, of which those described are merely examples that are related to the discussion herein.

FIG. 4 further illustrates a display 412, which may be passive, emissive or any other form of display. In one implementation, the display 412 may be an active display such as a liquid crystal display, plasma display, light emitting diode display, organic light emitting diode display, and so forth. These displays may comprise drive electronics, such as a display drive matrix configured to affect individual pixels within the display 412. Additionally, in some implementations, the display 412 may be a 3D display capable of providing a 3D image. For example, the display 412 may produce a 3D image by providing alternating left-eye and right-eye images with or without the use of shuttering or filtering eyeglasses. Accordingly, in some implementations, the visual representations and other user interface components herein may be rendered in 3D.

In some implementations, multiple displays 412 may be present on the electronic device 400. When multiple displays are present, these displays may be of the same or different types. For convenience only, the display 412 of the electronic device 102 is shown in a generally rectangular configuration. However, it is understood that the display 412 may be implemented in any shape, and may have any ratio of height to width. Also, for stylistic or design purposes, the display 412 may be curved or otherwise non-linearly shaped. Furthermore, the display 412 may be flexible and configured to fold or roll.

One or more communication interfaces 414 may support both wired and wireless connection to various networks, such as cellular networks, radio, WiFi networks, short-range or near-field networks (e.g., Bluetooth®), infrared signals, local area networks, wide area networks, the Internet, and so forth. The communication interface 414 may further allow a user to access storage on another device, such as a user's computing device, a network attached storage device, or the like.

The electronic device 400 may include the accelerometer 106 for determining the accelerometer data 120. The electronic device 400 may further be equipped with various other input/output (I/O) components 416. Such I/O components may include a touchscreen and various user actuatable controls (e.g., buttons, a joystick, a keyboard, a mouse, etc.), speakers, a microphone, a camera, connection ports, and so forth. For example, the operating system 406 of the electronic device 400 may include suitable drivers configured to accept input from a keypad, keyboard, or other user actuatable controls and devices included as the I/O components 416. For instance, the user actuatable controls may include page turning buttons, navigational keys, a power on/off button, selection keys, and so on. Additionally, the electronic device 400 may include various other components that are not shown, examples of which include removable storage, a power source, such as a battery and power control unit, a global positioning system (GPS) device, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Process

Figure 5:
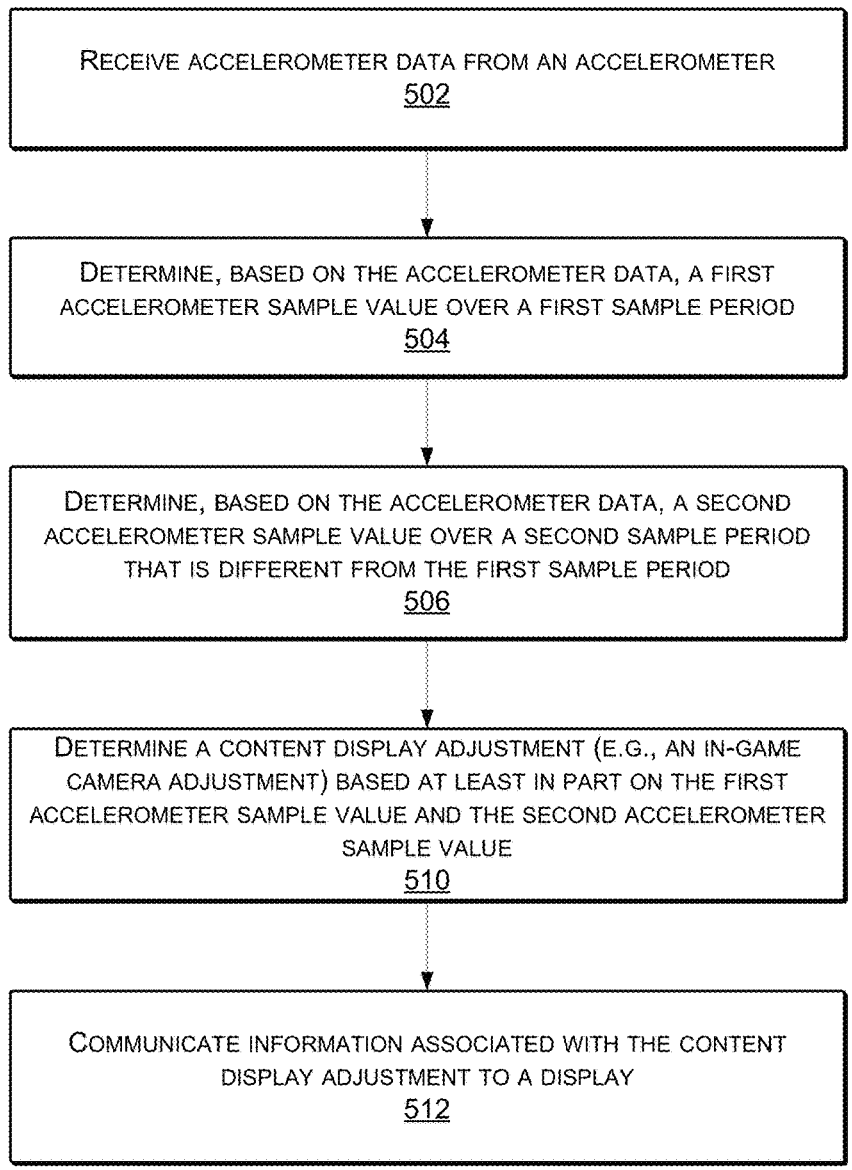
FIG. 5 illustrates an example process for updating information displayed on an electronic device.

FIG. 5 illustrates an example process 500 for updating information displayed on an electronic device, as described above. FIG. 5 illustrates the process 500 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

At 502, the process 500 includes receiving accelerometer data from an accelerometer. As an illustrative example, referring to FIG. 1, the accelerometer data 120 may be received from the accelerometer 106. In some implementations, the accelerometer module 114 may periodically poll the accelerometer 106 for the accelerometer data 120 (e.g., to sample each frame of a game based on a frame display rate of the game).

At 504, the process 500 includes determining, based on the accelerometer data, a first accelerometer sample value over a first sample period. To illustrate, the accelerometer sampler module 116 of FIG. 1 may determine the short sample value 126 over the short sample period 122 based on the accelerometer data 120.

At 506, the process 500 includes determining, based on the accelerometer data, a second accelerometer sample value over a second sample period that is different from the first sample period. To illustrate, the accelerometer sampler module 116 of FIG. 1 may determine the long sample value 132 over the long sample period 128 based on the accelerometer data 120.

At 508, the process 500 includes determining a content display adjustment (e.g., an in-game camera adjustment) based at least in part on the first accelerometer sample value and the second accelerometer sample value. To illustrate, the content display adjustment module 118 of FIG. 1 may determine the in-game camera adjustment 142 based at least in part on sample values received from the accelerometer sampler module 116.

At 510, the process 500 includes communicating information associated with the content display adjustment to a display. For example, the content display adjustment module 118 of FIG. 1 may provide the in-game camera adjustment 142 to the display 112. As an illustrative example, the in-game camera adjustment 142 may result in the in-game perspective changes shown in FIGS. 2 and 3 in response to a re-orientation of the electronic device 102 by the user 104.

Thus, FIG. 5 illustrates that a content display adjustment (e.g., an in-game camera adjustment) may be determined based on accelerometer data without absolute orientation information from a gyroscope or other device capable of providing such information. The techniques may utilize accelerometer sample values calculated over different sample periods to provide an in-game camera experience with transitions that may not appear to the user 104 to be jittery or unnaturally slow.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   executing an application to provide content display associated with a user interface on a display;
   receiving accelerometer data from at least one accelerometer;
   determining a first accelerometer sample value and a second accelerometer sample value, the first accelerometer sample value being based on the accelerometer data over a first sample period, the second accelerometer sample value being based on the accelerometer data over a second sample period, the second sample period being longer than the first sample period;
   determining a difference between the first accelerometer sample value and the second accelerometer sample value;
   determining a content display adjustment for a prior content display based at least in part on the difference, the content display adjustment being a modification of the prior content display; and
   communicating information associated with the content display adjustment to the display.

2. The method of claim 1, and further comprising determining the content display adjustment based at least in part on the difference being at least a threshold value.

3. The method of claim 1, wherein receiving accelerometer data comprises:
   receiving data from a first accelerometer and determining the first accelerometer sample value; and
   receiving data from a second accelerometer and determining the second accelerometer sample value.

4. The method of claim 1, wherein determining the content display adjustment comprises at least one of:
   including display information that was not in the prior content display, or removing at least some display information that was in the prior content display.

5. The method of claim 1, wherein the prior content display provides a view, and the content display adjustment represents a rotation of the view.

6. The method of claim 1, wherein the second sample period overlaps at least a portion of the first sample period.

7. An electronic device comprising:
   a display;
   at least one accelerometer to provide accelerometer data;
   computer-readable media having instructions thereon; and
   at least one processor connected to the display, the at least one accelerometer, and the computer-readable media, and responsive to the instructions to:
      execute an application to provide content display associated with a user interface on the display;
      receive the accelerometer data from the at least one accelerometer;
      determine a first accelerometer sample value and a second accelerometer sample value, the first accelerometer sample value being based on the accelerometer data over a first sample period, the second accelerometer sample value being based on the accelerometer data over a second sample period, the second sample period being longer than the first sample period;
      determine a difference between the first accelerometer sample value and the second accelerometer sample value;
      determine a content display adjustment for a prior content display based on the difference, the content display adjustment being a modification of the prior content display; and
      communicate information associated with the content display adjustment to the display.

8. The electronic device of claim 7, wherein the at least one processor is further responsive to the instructions to determine the content display adjustment based at least in part on the difference being at least a threshold value.

9. The electronic device of claim 7, wherein the at least one processor is further responsive to the instructions to determine the first accelerometer sample value and the second accelerometer sample value.

10. The electronic device of claim 7, wherein the second sample period overlaps at least a portion of the first sample period.

11. The electronic device of claim 7, wherein the content display adjustment includes at least one of addition of display information to the prior content display or a termination of at least some display information in the prior content display.

12. The electronic device of claim 7, wherein the prior content display provides a view, and the content display adjustment represents a rotation of the view.

13. The electronic device of claim 7, and further comprising:
a second accelerometer; and
wherein the at least one processor is responsive to the instructions to receive data from the at least one accelerometer to determine the first accelerometer sample value, and to receive data from the second accelerometer to determine the second accelerometer sample value.

14. An electronic device comprising:
a display to present perspective views of a game scene;
at least one accelerometer responsive to movement of the electronic device to provide accelerometer data;
computer-readable media having instructions thereon; and
a processor connected to the display, the at least one accelerometer, and the computer-readable media, and responsive to the instructions to:
execute an application to provide content display associated with different perspective views;
receive the accelerometer data;
determine a first accelerometer sample value and a second accelerometer sample value based on the accelerometer data, the first accelerometer sample value being based on the accelerometer data over a first sample period, the second accelerometer sample value being based on the accelerometer data over a second sample period, the second sample period being longer than the first sample period;
determine a difference between the first accelerometer sample value and the second accelerometer sample value;
determine that the difference is at least a threshold value;
determine a content display adjustment based at least in part on the difference, the content display adjustment being a modification of a prior perspective view; and
provide the content display adjustment to the display.

15. The electronic device of claim 14, wherein the second sample period overlaps at least a portion of the first sample period.

16. The electronic device of claim 14, wherein the processor is further responsive to the instructions to cause the content display adjustment to include addition of display information to the prior perspective view.

17. The electronic device of claim 14, wherein the processor is further responsive to the instructions to cause the content display adjustment to terminate at least some display information in the prior perspective view.

18. The electronic device of claim 14, wherein the content display adjustment represents a rotation of the prior perspective view.

19. The electronic device of claim 14, wherein the at least one accelerometer detects the movement in an x-axis, a y-axis, and a z-axis, the x-axis, the y-axis, and the z-axis being relative to the electronic device.

20. The electronic device of claim 14, further comprising:
a second accelerometer; and
wherein the processor is responsive to the instructions to receive data from the at least one accelerometer to determine the first accelerometer sample value, and to receive data from the second accelerometer to determine the second accelerometer sample value.

* * * * *